Nov. 13, 1928.

E. GAUTHIER

SCREW FORMING MACHINE

Filed Aug. 5, 1925

Inventor
Ernest Gauthier
by H. A. Vatteson
Att'y.

Nov. 13, 1928.
E. GAUTHIER
SCREW FORMING MACHINE
Filed Aug. 5, 1925
1,691,055
3 Sheets-Sheet 2
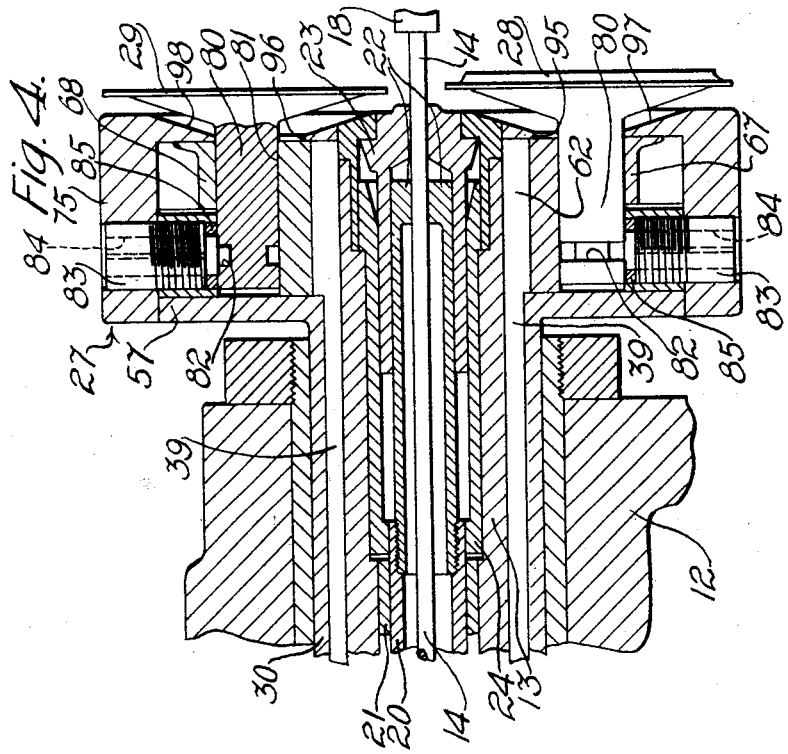
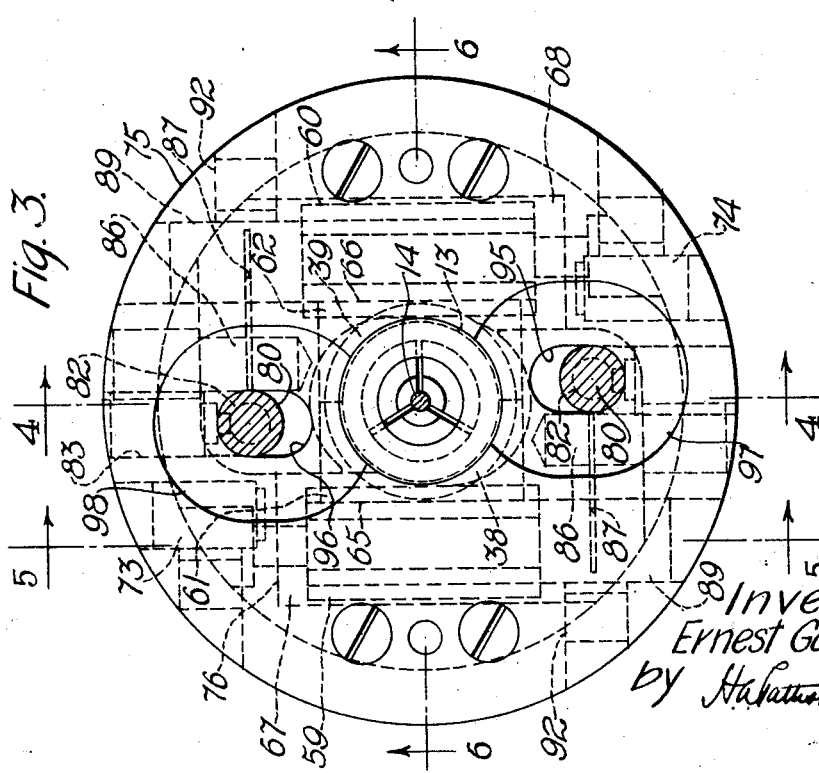
Inventor
Ernest Gauthier
by *H. W. Fathom*
Att'y.

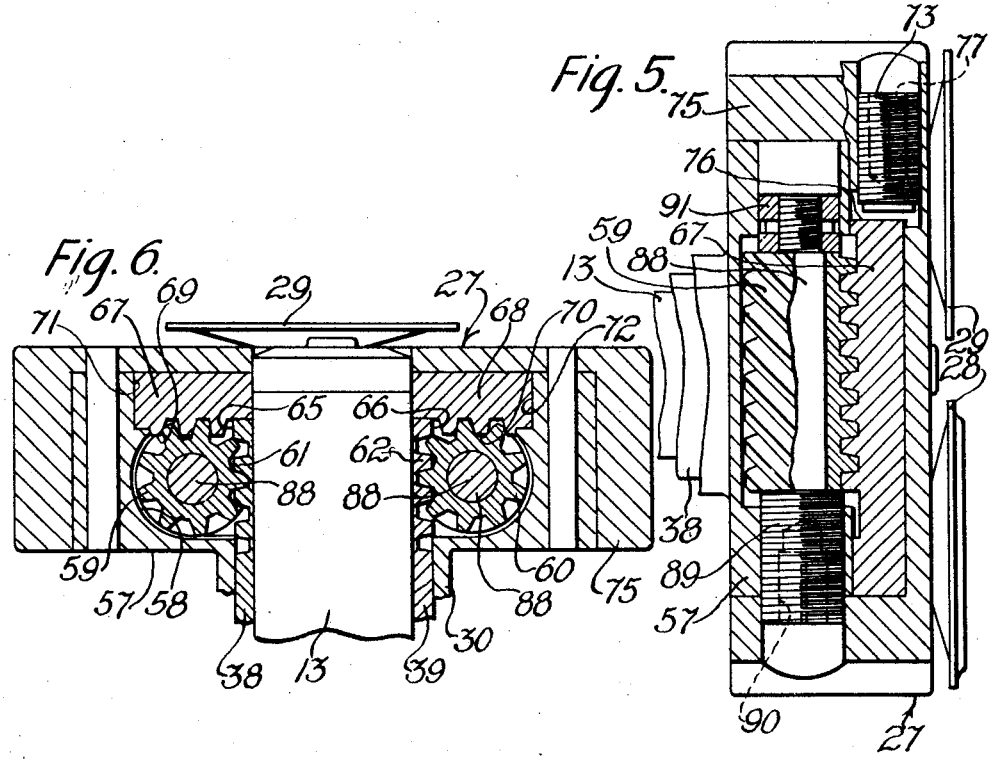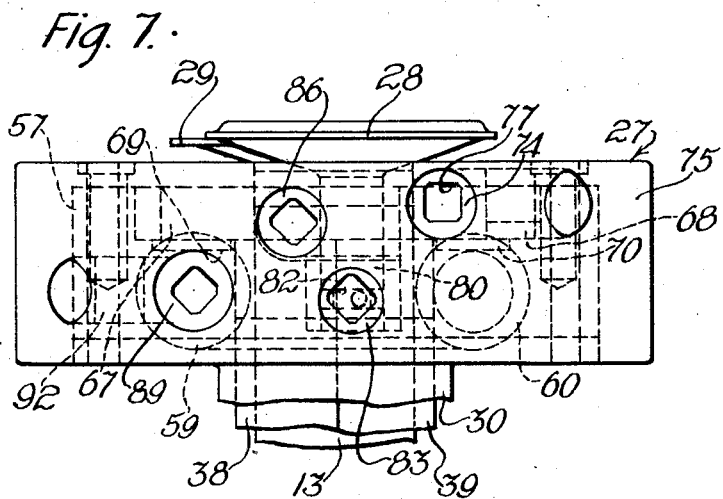

Patented Nov. 13, 1928.

1,691,055

UNITED STATES PATENT OFFICE.

ERNEST GAUTHIER, OF CHICAGO, ILLINOIS, ASSIGNOR TO WESTERN ELECTRIC COMPANY, INCORPORATED, OF NEW YORK, N. Y., A CORPORATION OF NEW YORK.

SCREW-FORMING MACHINE.

Application filed August 5, 1925. Serial No. 48,226.

This invention relates to machines employed for the manufacture of screws and the like automatically, and more especially to such machines involving the feature of manufacturing articles from a coil or indefinite length of wire.

The object of this invention is the provision in a machine of the above construction of means which is comparatively simple, easily maintained and which may be operated at high speeds to accurately sever the completed article.

According to the preferred form of the invention as illustrated in the accompanying drawings a machine is contemplated in which screws and the like may be made automatically from a coil or indefinite length of wire. The wire from which the articles are to be made is preferably advanced intermittently from a reel or coil of wire from which it passes through straightening mechanism prior to its reaching a point where the desired operations are performed. As is the case with machines of this character several different kinds of tools are arranged to be rendered effective for performing certain characteristic operations on the wire or stock upon its being advanced to the working point. These tools may be operated either simultaneously or successively, depending upon the nature of the work being performed. Following or during the operation of the several tools mechanism is operated for causing the movement of a forming and a severing tool into engagement with the wire or stock for forming the end face of the screw and severing the completed article from the stock. Specifically, this mechanism comprises a pair of circular cutters which are arranged on a rotary head to which motive power is imparted for causing their rotation bodily about the periphery of the stock and which are operatively connected to sleeves capable of being moved in a longitudinal direction to cause the forming and the severing tool to be moved inwardly into engagement with the stock. After the completed article has been severed mechanism is operated for advancing the stock to present a sufficient length of stock to permit the formation of another article.

Other objects and advantages of the invention will more fully appear from the following detailed description taken in connection with the accompanying drawings, and in which—

Fig. 3 is an enlarged right hand end view of the head mounting the forming and cutting off tools with the tools removed;

Figs. 4, 5 and 6 are sections taken on lines 4—4, 5—5, and 6—6, respectively, of Fig. 3, and Fig. 7 is a plan view of the head as shown in Fig. 6

Figure 1:
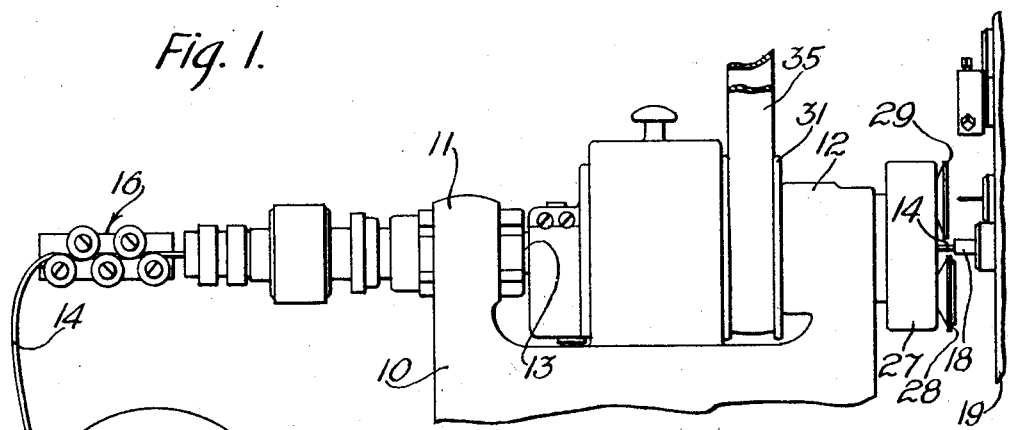
Fig. 1 is a fragmentary side elevation of a machine embodying the features of this invention.
Figure 2:
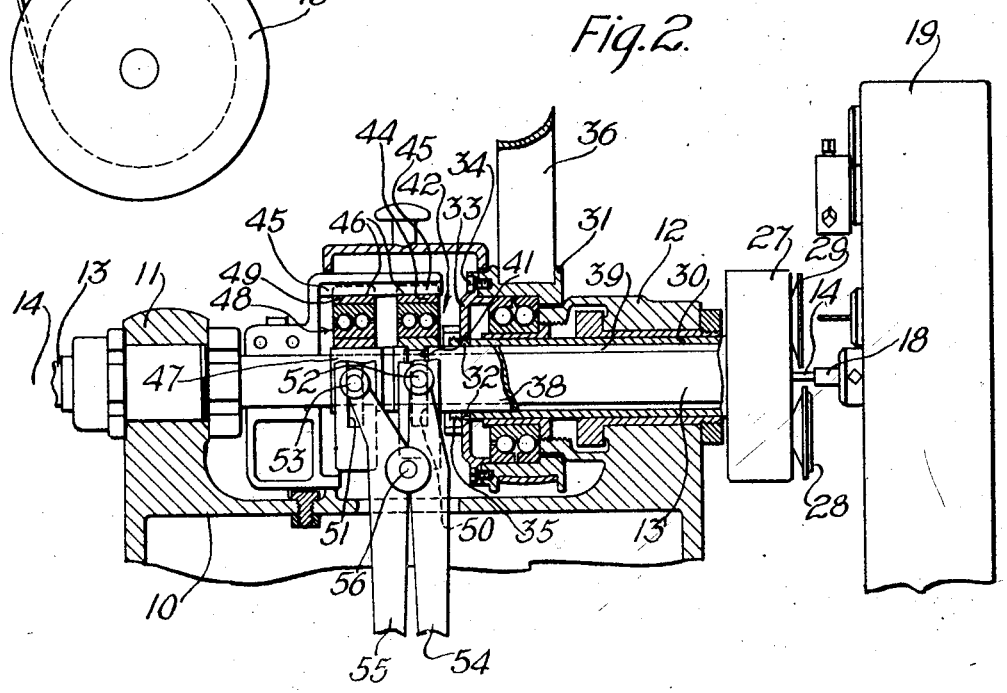
Fig. 2 is an enlarged vertical section of a portion thereof.

Referring now to the drawings in detail and particularly to Figs. 1 and 2 the numeral 10 indicates a portion of the frame of a machine adapted in the present embodiment for making screws. Brackets or journals are indicated at 11 and 12 which support in a manner hereinafter described opposite ends respectively of a stationary hollow spindle 13 through which the stock or wire 14 is moved. The wire is drawn from a coil of wire mounted upon a reel 15 (Fig. 1) suitably mounted below the spindle 13 at the left hand end thereof and near the floor and before its entrance into the spindle 13 it passes through a straightening device indicated at 16. The wire is automatically advanced against a stop 18 carried by an intermittently rotatable turret 19 upon which are rotatably mounted suitable tools in turn successively brought into operation upon the wire stock during the operation of the machine in a manner well known in this class of machines. The wire is advanced and in turn chucked or gripped by the movement of sleeves 20 and 21 respectively (Fig. 4) which are operated in proper sequence by cam mechanism (not shown) in a manner well understood to those skilled in the art. The sleeve 20 carries a set of friction fingers 22 (Fig. 4) adapted to grip the wire and advance it against the stop 18 and to slide rearwardly thereon after the wire has been gripped by a spring collet 23 (Fig. 4) actuated by a movement to the right of a sleeve 24 through the operation of the sleeve 21. Rotatably mounted around the right hand end of the spindle 13 is a circular head 27 which carries forming and cutting off tools 28 and 29, respectively, which will be referred to in greater detail hereinafter. Extending from the left hand side of the head 27 is a sleeve 30 which is secured at its end to a pulley 31 (Fig. 2) through the engagement of a plurality of teeth 32 formed upon a ring or cap 33 secured to the left hand end face of the pulley 31 by screws indicated at 34, the teeth 32 engaging in a plurality of notches 35 formed in the end face of the sleeve 30. The pulley 31 is rotated by a belt 36 driven from a suitable source of power (not shown). The sleeve 30 is of greater diameter than the spindle 13 and fitting within the space therebetween is a pair of sleeve like semi-circular members 38 and 39 upon which the sleeve 30 rotates. The members 38 and 39 revolve with the sleeve 30 and head 27 through their connection therewith which will be described hereinafter. In addition to the rotary movement imparted to the members 38 and 39 they are each adapted to be independently reciprocated upon the stationary spindle 13 during their rotation. The left hand end of the upper member 38 (Fig. 2) is provided with a dove tail groove 41 which extends around the semi-circular periphery thereof and suitably secured from longitudinal movement therein is a ball bearing 42 the outer shell 44 of which is fixed from rotation by a depending finger 45 suitably supported upon the stationary spindle 13, the finger 45 extending into a slot 46 formed in the periphery of the shell 44. The extreme left hand end of the lower member 39 (Fig. 2) is not semi-circular but completely encircles the spindle 13 as indicated at 47 and mounted thereon is a ball bearing 48 which is suitably secured from longitudinal movement thereon. The outer shell 49 of the ball bearing 48 is held from rotation in a manner similar to that described in connection with the ball bearing 42. Each of the shells 44 and 49 is provided at opposite points spaced 90° from the slots 46 with slots 50 and 51 into which extend pins 52 and 53, respectively, carried upon the bifurcated upper ends of rocker levers 54 and 55, respectively, pivotally mounted upon a common axis indicated at 56 carried upon the frame 10. The lower ends of the levers 54 and 55 are suitably connected to a cam mechanism (not shown) adapted to rock the levers in proper sequence and at suitable intervals the purpose of which will be brought out hereinafter. It will readily be apparent that upon rocking the levers 54 and 55 about the axis 56 that the members 38 and 39 will be reciprocated in a longitudinal direction during their continued rotation thereof upon the stationary spindle 13.

The head 27 comprises a circular shaped member 57 (Figs. 3 and 4) having formed integral therewith upon one end the sleeve 30 and provided with an irregular shaped opening 58 (Fig. 6) within which are suitably journaled at points equidistant from the axis of the head a pair of 45° spiral pinion gears indicated by the numerals 59 and 60. The gears 59 and 60 mesh with racks 61 and 62 provided upon flat faces 65 and 66 formed upon the ends of the semi-circular members 38 and 39 which extend into the head 27 as clearly indicated in Figs. 4 and 6. The gears 59 and 60 also mesh with a pair of tool holders 67 and 68, respectively, the engaging faces of which are provided with rack teeth as indicated at 69 and 70, respectively, which are disposed at a 45° angle. The ends of the members 38 and 39 which extend into the member 57 form a rectangle as clearly indicated in Fig. 3 the opposite faces 65 and 66 of which have the racks 61 and 62 formed thereon with the oppositely disposed faces at right angles to the faces 65 and 66 arranged to slide in the member 57. It will thus be apparent that in the operation of the machine that the levers 54 and 55 upon being rocked to and fro will cause the semi-circular members 38 and 39 to be reciprocated and they in turn through the racks 61 and 62 provided upon their ends will rotate the spiral gears 59 and 60 which will cause the cutter holders 67 and 68 to move in a substantially straight line and thereby actuate the tools 28 and 29 to and from the wire stock 14. The cutter holders 67 and 68 are mounted for reciprocatory movement in suitable guideways indicated at 71 and 72, respectively, formed in the opening 58 of the member 57. In the various views illustrating in detail the head 27 the parts are shown in such positions that the forming and cutting off tools 28 and 29, respectively, are at their extreme outer movement and removed from the wire 14 to be worked upon.

Referring to Figs. 5 and 7 at 73 and 74 are adjustable stop screws mounted in an outer shell member 75 of the head 27. The stop screws are for the purpose of limiting the inward movement of the tool holders 67 and 68, respectively, and consequently the movement toward the wire 14 of the forming and cutting off tools 28 and 29, respectively, the mounting of which upon the tool holders will be described presently. As clearly indicated in Fig. 5 the movement upwardly of the tool holder 67 is limited by the top surface 76 engaging the lower surface of the stop screw 73. The stop screws are provided with square openings 77 for the entrance of a tool whereby the screws may be threaded in or out and thereby limit the inward movement of the tool holders. The forming and cutting faces of the tools 28 and 29 are adapted to be adjusted for longitudinal position upon their respective holder relative to each other and to the front face of the shell 75 and thereafter to be clamped in position by the following devices. As each of the tools are mounted in an identical manner the description of the mounting thereof will be confined to that of the tool 29. The tool 29 is provided with a shank portion 80 which fits within an opening 81 provided in the tool holder 68, the shank 80 being provided with a circular channel 82 near its end. Passing through an opening provided in the outer shell 75 and threaded into the tool holder 68 and at right angles to the axis of the shank 80 is a screw 83 provided with a square opening 84 adapted for the entrance of a hand tool (not shown). The screw 83 is threaded into the tool holder and against a washer 85 contacting with the shank 80. The hand tool at its lower engaging end is provided with a suitable eccentric portion arranged to be entered in the channel 82. It will be apparent that upon entering the tool in the opening 84 of the screw 83 and rotating it that the screw may be released and upon moving the hand tool downwardly until the eccentric portion thereof enters the channel 82 and then causing it to be rotated that the tool 29 will be moved upon the tool holder 68 in a direction at right angles to the axis of the screw 83. Upon correctly positioning the tool 29 upon the tool holder it is clamped thereto by a suitable set screw 86 indicated in dotted outline in Fig. 3 in addition to the clamping action of the screw 83. The screw 86 has a threaded engagement with the tool holder below a slot 87 through which the screw passes. The slot extends from the wall of the opening 81 for a suitable distance (Fig. 3) whereby upon threading the screw into position, the slot permitting the tool holder to flex sufficiently, the shank 80 will be rigidly held in the opening 81.

Means is also provided for initially positioning the tool holders 67 and 68 and thereby the tools 28 and 29 with respect to the wire stock 14 which comprises the following: Each of the spiral gears 59 and 60 is loosely carried upon a reduced portion 88 of a screw 89 (Fig. 5) having a threaded engagement in the member 57 and operable through an opening formed in the outer shell 75 by inserting a suitable hand tool in a square opening 90 formed in one end of the screw 89. Upon the opposite ends of the screw 89 is suitably secured a collar 91. Upon rotating the screw 89 by the hand tool it will be apparent that the associated spiral gear may be moved bodily in a longitudinal direction, either upwardly or downwardly as viewed in Fig. 5 depending upon the direction of rotation of the screw 89. It will also be apparent that due to the engagement of the gear with the rack of the associated semi-circular member 38 or 39 which member is stationary at this time that the gear will also revolve due to the 45° angle of the teeth thereof and thereby cause the associated tool holder 67 or 68 to be actuated and thereby carry the tool mounted thereon toward or from the wire stock 14. Upon this adjustment being completed the screw 89 is clamped in position by a set screw 92 (Fig. 3) inserted through a suitable opening formed in the shell 75 and threaded into the inner member 57.

The outer shell 75 of the head 27 is provided with elongated openings 95 and 96 (Figs. 3 and 4) provided at their outward ends with similarly shaped tapered enlargements 97 and 98, respectively, so that the tools 28 and 29, respectively, may freely move to and from the wire stock 14 and also to permit their correct initial positioning upon the tool holders 67 and 68, respectively.

The forming and cutting off tools 28 and 29 are in the form of notched disks with their working faces suitably shaped to perform the work desired, the particulars of which will not be described since their requisites are well known in the art.

The operation of the machine is as follows:

The forming and cutting off tools 28 and 29 provided with suitable working faces for the work to be perforated are first selected and positioned longitudinally upon their respective reciprocally mounted holders and clamped thereto and thereafter the holders are initially positioned upon the head 27 and adjusted for their limit of movement in carrying the tools toward the work all in the manner as hereinbefore described. The turret 19 is then set up with the required tools for such other work that is to be performed upon the screw and the stop 18 also carried by the turret is adjusted to properly limit the feeding movement of the wire stock 14. A coil of wire of suitable size carried upon the reel 15 is arranged adjacent the left hand end of the machine (Fig. 1) and the end of the wire is passed through the straightening device 16 and threaded into the sleeve 20 within the hollow spindle 13 and between the friction fingers 22 with the end of the wire 14 abutting the stop 18 upon the turret 19. The spring collet 23 is then caused to operate through the actuation of the sleeves 21 and 24 to grip the wire stock and hold it while the work is being performed. Thereafter upon setting the machine in operation the head 27 carrying the forming and cutting off tools 28 and 29 will be continuously revolved through the driving connection of the sleeve 30 with the driving pulley 31. Due to the locking engagement provided by the flat faces formed upon the ends of the semi-circular members 38 and 39 with the member 57 of the head 27 which extends thereinto the members 38 and 39 will also be caused to rotate with the head 27, the members 38 and 39 having a bearing upon the stationary hollow spindle 13. In the operation of the machine through suitable cam mechanism (not shown) the levers 54 and 55 will be rocked about their common axis 56 in proper sequence and in the manner hereinbefore described cause the members 38 and 39 to be longitudinally and independently reciprocated during their continued rotation with the head 27 upon the spindle 13. The members 38 and 39 through the racks 61 and 62 formed thereon meshing with the spiral gears 59 and 60 in turn also meshing with the rack teeth 69 and 70, respectively, provided upon the tool holders 67 and 68 will cause the tools 28 and 29, respectively, to travel in a straight line to engage the wire stock in sequence to perform the necessary forming operation and finally to cut off the finished screw from the wire stock 14. During the forming operation and before the completion of the cutting off operation such other work upon the screw being formed as is desired, is being performed by the various tools carried by the turret 19, which is automatically and intermittently rotated to position the tools in proper sequence in working position by suitable mechanism which being well known in this class of machines has not been disclosed. The collet 23 now releases the wire stock and the gripping fingers, which in the meantime have been moved to the left after the feeding operation previously performed, are moved to the right to feed the next length of stock into position against the stop 18 which has been indexed into position and thereafter in the continued operation of the machine it performs the same cycle of operations hereinabove described upon successive lengths of wire stock until the coil of wire is exhausted.

What is claimed is:

1. In a machine for severing blanks of predetermined lengths from a continuous metal strand, a stationary spindle, means for intermittently advancing the strand axially through said spindle, a tool supporting head carried by and rotatable about the spindle, a severing tool carried by said head and slidable therein toward and away from the strand, means for actuating the severing tool comprising a rack secured to the tool, a pinion gear meshing with said rack, and revoluble means surrounding the stationary spindle for rotating said pinion gear to cause a movement of the severing tool.

2. In a machine for automatically making screws and the like, a reel for the stock, means for intermittently advancing said stock, a plurality of tools, means for rendering said tools effective for performing certain desired operations on said stock, a forming and a severing tool, means for rotating said forming and severing tools, means for independently moving said forming and severing tools including a pinion gear individual to each of said tools, and cam operated means for imparting a rotary motion to said pinion gears for causing the movement of said forming and severing tools in a substantially straight line into engagement with said stock.

3. In a machine for severing material, a spindle, a rotatable tool supporting head, a plurality of tools carried by the head and slidable therein towards and away from the center of rotation, a plurality of semi-circular sleeves cooperating to form a tube and revoluble about the spindle, means for connecting the sleeves with the tools, and means for axially reciprocating the sleeves to actuate the tools.

4. In a material working machine, a stationary spindle, a tool supporting head rotatable thereabout, a severing and a forming tool slidably mounted in the head, means for independently actuating the tools during rotation comprising semi-circular sleeves substantially surrounding the stationary spindle and having rack portions, pinions meshing with the rack portions of the sleeves, racks meshing with the pinions for holding the tools, and means for reciprocating the sleeves independently of each other whereby the tools may be moved toward and away from the material being worked.

5. In a material working machine, a stationary hollow spindle, means for advancing the material through the spindle, a pair of semi-circular sleeves rotatably mounted about the spindle and having rack portions at one end, a tool carrier rotatable with the sleeves, a spiral pinion individual to and meshing with the rack portion of each sleeve, tool holders slidably mounted in the rotatable tool carrier and having rack portions meshing with the spiral pinions, and means for reciprocating the rotating sleeves whereby the tools may be independently controlled to advance them to and away from the material being worked.

6. In a material working machine, a spindle, a rotatable tool carrier supported thereon, a pair of semi-circular sleeves movable with relation to the spindle and having rack portions at one end terminating within the tool carrier, a spiral pinion individual to and meshing with the rack portion of each sleeve, tool holders slidably mounted in the tool carrier and having a rack portion engaging the pinion whereby the holders may be reciprocated axially of the pinions, and means for independently actuating the semi-circular sleeves to impart rectilinear motion to the tool holders.

In witness whereof, I hereunto subscribe my name this 28th day of July A. D., 1925.

ERNEST GAUTHIER.